United States Patent
Weishaar et al.

(10) Patent No.: US 7,598,882 B2
(45) Date of Patent: Oct. 6, 2009

(54) SAFETY DEVICE AND METHOD FOR AN AUTOMATICALLY OPERATING INSTALLATION HAVING AT LEAST ONE MOVEABLE PART

(75) Inventors: Christoph Weishaar, Waiblingen-Bitterfeld (DE); Gerhard Betz, Ebersbach-Buenzwangen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 15 days.

(21) Appl. No.: 11/805,570

(22) Filed: May 23, 2007

(65) Prior Publication Data

US 2008/0007417 A1 Jan. 10, 2008

Related U.S. Application Data

(63) Continuation of application No. PCT/EP2005/011768, filed on Nov. 3, 2005.

(30) Foreign Application Priority Data

Nov. 24, 2004 (DE) ......................... 10 2004 058 471

(51) Int. Cl.
*G08B 21/00* (2006.01)
(52) U.S. Cl. ..................... 340/669; 340/679; 340/680; 100/341
(58) Field of Classification Search ............... 340/669, 340/679, 680, 540, 674; 100/341; 324/757, 324/754; 73/727, 720
See application file for complete search history.

(56) References Cited

U.S. PATENT DOCUMENTS

| 6,114,965 A * | 9/2000 | Schoch .................. 340/680 |
| 6,384,734 B1 * | 5/2002 | Ohno et al. .............. 340/679 |
| 2002/0104958 A1 | 8/2002 | Fiessler |

FOREIGN PATENT DOCUMENTS

| DE | 86 11 018.7 | 10/1987 |
| DE | 199 10 802 A1 | 9/1999 |
| DE | 199 00 587 A1 | 7/2000 |
| DE | 100 27 156 A1 | 12/2001 |
| DE | 694 33 308 T2 | 10/2004 |
| EP | 0 870 172 | 10/1998 |
| EP | 1 177 889 A2 | 2/2002 |
| EP | 1 186 975 A2 | 3/2002 |
| WO | WO 97/25568 | 7/1997 |

OTHER PUBLICATIONS

European Standard EN 954-1; Safety-related parts of control systems; 1996; 34 pages.

* cited by examiner

*Primary Examiner*—Anh V La
(74) *Attorney, Agent, or Firm*—Harness, Dickey & Pierce, P.L.C.

(57) ABSTRACT

A safety device for an automatically operating installation determines at least one movement variable of a moving installation part in a safety-related manner. The safety device includes an acceleration sensor and an evaluation unit. The acceleration sensor is adapted to be coupled to the moving installation part in order to detect any acceleration of the moving installation part. The evaluation unit determines a movement velocity and/or a movement travel of the installation part on the basis of the acceleration.

28 Claims, 3 Drawing Sheets

SAFETY DEVICE AND METHOD FOR AN AUTOMATICALLY OPERATING INSTALLATION HAVING AT LEAST ONE MOVEABLE PART

CROSS REFERENCES TO RELATED APPLICATIONS

This application is a continuation of international patent application PCT/EP2005/011768, filed on Nov. 3, 2005 designating the U.S., which international patent application has been published in German language as WO 2006/056300 and claims priority from German patent application DE 10 2004 058 471.0, filed on Nov. 24, 2004. The entire contents of these priority applications are incorporated herein by reference.

BACKGROUND OF THE INVENTION

The present invention relates to the safety-relevant or fail-safe determination of a movement variable on an automatically operating installation (or machine), such as a manufacturing installation and/or conveyor installation. More particularly, the invention relates to the fail-safe determination of a movement velocity and/or the movement travel of the beam of a press brake or a similar installation having a tool which moves like a stamp. The invention also relates to a safety device and to a method for fail-safely stopping of a moving part of such an installation in response to the movement variable.

DE 100 27 156 A1 discloses a press brake or a similar machine, in which a first machine part carries out a stamp-like working movement with respect to a second machine part. This working movement can be used to shape a workpiece under pressure, or else for cutting or stamping. As will readily be appreciated, such a stamp-like working movement is highly dangerous to the operator who, for example, has to insert and align the workpiece under the moving part. In fact, accidents occur again and again, in which an operator is subjected to severe crushing, even with body parts being cut off, as a result of carelessness and/or incorrect actions. In order to prevent such accidents, the installation from DE 100 27 156 A1 has a non-contact protective device. The protective device comprises a light barrier arrangement, whose light beams run parallel to the front edge of the moving tool, with the light barrier arrangement being moved with the working movement of the tool. If one or more of the light beams of the light barrier arrangement is interrupted, the working movement is typically stopped immediately. However, the light barrier arrangement has to be deactivated (what is called muting) shortly before the press closes, because the interruption of the light beams by the workpiece would otherwise prevent the press from closing.

In order to allow older presses to be retrofitted with such a light barrier arrangement, DE 100 27 156 A1 proposes that the light barrier arrangement be deactivated (muted) when the movement velocity of the stamp-like tool is below a predetermined velocity. This is because, in the case of a press, the stamp-like tool is normally driven from its initial rest position (what is called upper dead point) at high speed towards the workpiece. However, the workpiece is shaped at a low velocity (creeping speed). According to DE 100 27 156 A1, deactivation of the light barrier arrangement solely as a function of the movement velocity of the tool has the advantage that even old presses can be easily retrofitted with the described light barrier arrangement. On the other hand, the proposed procedure is dependent on the capability to fail-safely determine the respective velocity of the tool, i.e. the movement velocity of the tool must be determined in a safety-related manner such that a dangerous state for the operator is prevented to occur even in the event of a fault or functional failure in the safety device.

In the case of the press from DE 100 27 156 A1, the velocity of the tool is therefore determined by two measurement modules, with one measurement module being in the form of an incremental shaft encoder, in which a cable which is fixed to the tool is wound up and unwound by the working movement. The rotary movement which is produced by the winding up and unwinding is detected by an incremental shaft encoder or a rotation sensor. The second measurement module has an inductive sensor, through which a magnetic measuring tape is moved, with the magnetic measuring tape likewise following the movement of the tool. Alternatively, measurement devices are disclosed which include a toothed rod, a linear potentiometer, a translucent scale with a light barrier, or an inductive sensor with a perforated strip of sheet metal.

These sensors all have in common that their physical dimensions depend on the size of the installation and the movement travel of the moving installation part. If, for example, the intention is to monitor a movement travel of 1000 mm, a correspondingly long cable, measuring tape or scale is required. The proposed measurement means are therefore physically large, and they involve complex installation with correspondingly high costs. This applies even more to the safety-relevant determination of movement variables of a moving installation part, since redundant measurement means generally have to be used, for safety reasons.

A similar installation, again in the form of a press, is known from WO 97/25568. An optical encoder disk is used here in order to monitor the working movement of the tool. The encoder disk is rotated by a chain, a cable or the like, which is attached to one end to the moving tool. This has the same disadvantages in terms of material costs, dimensions and installation effort as the installation from DE 100 27 156 A1.

SUMMARY OF THE INVENTION

In view of the above, it is an object of the invention to provide a cost-effective and physically small alternative for fail-safely determining a movement variable, such as a movement velocity and/or movement travel, of a moving part of a generally stationary installation.

According to one aspect, there is provided an automatically operating installation comprising at least one installation part which is moved in an automated manner, comprising a control unit designed to control the movements of the installation part, and comprising a safety device which is designed to determine at least one movement variable of the installation part in a safety-related manner, said safety device comprising at least one acceleration sensor and an evaluation unit, wherein the acceleration sensor is adapted to be coupled to the moving installation part for detecting any acceleration of the moving installation part, and wherein the evaluation unit is designed to determine at least one of a movement velocity and a movement travel of the installation part on the basis of the acceleration detected by the acceleration sensor.

According to another aspect, there is provided a safety device for fail-safely determining at least one movement variable of a moving part of an automatically operating installation, the safety device comprising at least one acceleration sensor and an evaluation unit, wherein the acceleration sensor is adapted to be coupled to the moving installation part for fail-safely detecting an acceleration of the moving installation part, and wherein the evaluation unit is designed to fail-safely determine at least one of a movement velocity and a movement travel of the installation part on the basis of the acceleration.

According to yet another object, there is provided a method for safety-related stopping of a moving part of an automatically operating installation, comprising the steps of: fail-safely determining a movement variable of the moving part, fail-safely comparing the determined movement variable with a predefined reference value, and fail-safely stopping the moving part as a function of the determined movement variable and the defined reference value, wherein, in order to determine the movement variable, an acceleration of the moving part is first detected by means of an acceleration sensor, and wherein at least one of a movement velocity and a movement travel of the moving part is determined as the movement variable on the basis of the detected acceleration.

The new apparatus and method depart from the principle which has always been used until now for the safety-relevant determination of movement and/or velocity on stationary installations, namely the principle of using measurement means whose measuring range and physical dimensions depend on the size of the installation, and the magnitude of the measurement variable to be detected. This is because an acceleration sensor allows measurement detection of any acceleration irrespective of the size of the accelerated installation part, and irrespective of the distance which is traveled during the acceleration. The physical dimensions of an acceleration sensor are independent of the installation size and are independent of the distance which is traveled by the moving installation part.

Furthermore, acceleration sensors, such as capacitively or piezo-resistively operating acceleration sensors, are commercially available as integrated components, whose dimensions are only a few millimetres or centimetres. Suitable acceleration sensors are used, for example, in motor vehicles in order to trigger an airbag on the basis of the detected accelerations which occur, for example, in the event of an accident. In such situations, the detected acceleration itself is used as the measurement variable while, in contrast, the present invention determines a movement velocity and/or movement travels on the basis of the detected acceleration.

The physical relationship between acceleration, velocity and distance traveled has been known for a long time. For example, the velocity of a moving installation part can be calculated from the acceleration detected by measurement, by integrating the detected acceleration values over time. The distance traveled can equally be determined by integration over velocity. In order to obtain the actual values of the velocity or travel, however, the velocity and the position of the moving installation part at the start of the integration time must be known. However, this is not a problem in the case of stationary automatically operating installation since, in general, the installation is in a defined rest state at least after it has been switched on, or has started an initialization process. In the case of a press, a defined rest point (velocity zero, defined position) always occurs at the start of a working cycle, since every working cycle starts at what is called upper dead point of the press tool.

If the acceleration of the tool (or of an installation part which is connected to it) is now detected continuously, or at least at regular time intervals, from the start of the working movement, the actual velocity and the actual position can be determined mathematically.

The value of the velocity and of the distance traveled depend not only on the known start point, but also on the accuracy with which the acceleration sensor detects the acceleration of the moving installation part, and on the integration accuracy of the evaluation unit. However, there is no need for an exactly measured value for safety-relevant determination of velocity, travel or position. In fact, a threshold value analysis is sufficient in this case, which allows a statement that is reliable from the safety point of view as to whether the velocity, travel or position do not exceed or undershoot a threshold value which is defined for safety reasons. Since a suitable safety margin is planned in, it is easily possible to compensate for any measurement inaccuracies in the novel approach.

The new apparatus and method allow to use small and cost-effective acceleration sensors for the determination of velocity, travel and/or position of the moving installation part, even when the "measurement tolerances" that can be achieved in this way are inadequate for other control applications.

In addition to low component costs and small dimensions, the novel safety device further has the advantage that the assembly effort is considerably less than that of previous devices. The acceleration sensor does not require any reference point on the fixed part of the installation, in contrast to all previous measurement means. It can therefore be positioned virtually anywhere on the moving installation part. In the case of a press of the type described initially, it is particularly advantageous to integrate the at least one acceleration sensor in or on the receiver for the light barrier arrangement, thus considerably reducing the wiring complexity.

Furthermore, the novel safety device has the advantage that it can be used largely independently of the respective installation type, and thus for a plurality of different installations.

Finally, the new approach allows non-contact and therefore wear-free determination of the movement velocity, travel and/or position.

In a refinement, the safety device has at least two acceleration sensors, and the evaluation unit is designed to determine the movement velocity and/or movement travel of the installation part in a redundant form, by means of the at least two acceleration sensors.

This refinement is a particularly simple way to achieve better fail-safety by means of a plausibility check. Because of the small physical size of commercially available acceleration sensors, this advantageous refinement profits from the advantages mentioned above without any restrictions.

In a further refinement, the at least two acceleration sensors are designed such that they detect accelerations of the moving installation part on in each case one of at least two different sensor axes.

This refinement reduces the probability of the occurrence of what is called common-cause errors. This further enhances the safety of the novel safety device. On the other hand, a vectorial breakdown of the measured values along the at least two different sensor axes also allows an advantageous plausibility check.

In a further refinement, the at least two acceleration sensors are integrated into a common sensor housing.

This refinement makes it possible to further reduce the physical space required, and to further reduce the component and/or installation costs. Furthermore, it is particularly advantageous for the at least two integrated acceleration sensors to detect different sensor axes. This is because numerous versions of suitable acceleration sensors are commercially available, with the original purpose of these commercial acceleration sensors being multi-dimensional detection of accelerations in a plane or in three dimensions. For the purposes of the present refinement, however, the at least two sensor axes are used for redundant detection of accelerations of the moving installation part in one movement direction. This can be achieved highly cost-effectively in accordance with the preferred refinement.

In a further refinement, the at least two acceleration sensors are coupled to the moving installation part in at least two different mounting positions, such that different gravitational biases occur at the at least two acceleration sensors.

In this case, it is particularly preferable if the mounting positions of the at least two acceleration sensors are arranged offset through 180° with respect to one another, because they then produce output signals in opposite senses, which allow advantageous evaluation.

Since acceleration sensors typically comprise a moving mass whose displacement caused by inertia forces is detected by measurement, different mounting positions will affect the measurement. The reason is the displacement of the moving mass caused by the earth's gravity. This leads to a stationary bias value in the output signal from the acceleration sensors, i.e. a gravitational bias. The different gravitational biases can be used well for a plausibility check, thus further increasing the functional safety of the novel safety device. Furthermore, noise-voltage components can easily be eliminated by means of a particularly preferred subtraction process. This results in the safety-relevant determination of velocity and/or travel and/or position being possible even more accurately and reliably.

In a further refinement, the evaluation unit is designed to read the at least two acceleration sensors with a time offset between them.

This refinement makes it possible to achieve higher measurement resolution, and thus a faster reaction, from the safety device in a highly cost-effective manner.

In a further refinement, the at least one acceleration sensor has a test input for feeding in a test signal. The test signal is preferably connected to the evaluation unit, which is thus able to feed a test signal into the acceleration sensor.

Correct operation of the acceleration sensor during continuous operation of the safety device can be easily monitored by means of an expectation embodied in the test signal. For example, the test signal can be used to produce a defined displacement of the moving mass in the acceleration sensor, which must be reflected in the output signal from the acceleration sensor. This refinement therefore allows safe operation even when only a single acceleration sensor is used for determining velocity and/or travel. This allows the component costs to be further reduced.

In a further refinement, the evaluation unit is designed to determine a movement direction of the moving installation part on the basis of the acceleration, in a safety-related manner.

The movement direction of the moving installation part can easily be derived from the "mathematical sign" of the acceleration values detected by measurement. Furthermore, the movement direction can also be determined during the movement process from the velocity or position values obtained. The present refinement therefore offers information, without any significant additional costs, which can advantageously be included in the safety-critical assessment of an operating situation. For example, different movement velocities can often be allowed in an installation, depending on the respective movement direction, thus making it possible to increase the productivity of the installation without any adverse effect on safety.

In a further refinement, a detector is provided, which is designed to detect when the moving installation part has reached a defined rest position, with the detector being connected to the evaluation unit. In this case, the detector is preferably designed to be fail-safe in terms of the pertinent standards, such as within the meaning of Category 4 of European Standard EN 954-1 or similar safety regulations).

Such a detector advantageously can be used to reliably determine the start point of the movement of the moving installation part. This makes it possible to increase the accuracy and reliability of the measured values for the velocity, travel and/or position. In consequence, safety margins can be reduced, thus increasing the productivity of the monitored installation. It is particularly preferable, if the detector is a detector which is physically installed on the installation since, in this case, it produces a "real" measured value. As an alternative to this, however, the detector may also be "virtual", for example by the start point being derived from the data from the control system.

In a further refinement, a memory is coupled to the evaluation unit, which memory is designed to store a time reference profile of the at least one movement variable of the moving installation part. It is preferable for the evaluation unit to be designed to compare an instantaneous movement profile of the moving installation part with the reference profile, and to stop the moving installation part as a function of this.

The recording and monitoring of a reference profile, such as by way of example the time profile of the acceleration or velocity of the moving installation part during a working cycle, enhances reliable monitoring of the installation. In particular, it is very simple to quickly and reliably identify changes in the movement process of the installation, such as a prolonged slow-down movement resulting from ageing phenomena, wear or external influences, and to react quickly and reliably. Furthermore, the state of the installation can also be deduced from the recording of a movement profile, so that, for example, it is possible to match a safety margin to a specific installation. This makes it possible to match a safety device to an installation being monitored in such a way as to minimize the reduction in productivity.

In a further refinement, the moving installation part is a tool which moves like a stamp. It is furthermore preferable if at least one of the following variables is determined as the movement variable: movement velocity of the tool, slowing-down travel of the tool (this is, so to speak, the braking movement including the reaction time after initiation of an emergency stop), muting point of a non-contact protective device, switching time between high-speed and creeping speed of the tool, and movement direction of the tool.

As has already been mentioned above, the present invention is not restricted to presses and similar machines with installation parts moving in opposite directions with respect to one another. On the other hand, however, these examples are a particularly preferred application, since the movements which occur in such installations can be monitored easily and advantageously by means of the novel safety device. In particular, the movement velocities and movement paths of a press or of a similar tool are well suited for allowing determination of velocity, travel and/or position on the basis of the acceleration. Furthermore, in such installations, there is a particularly high risk, and therefore a very urgent requirement for a safety device of the present type.

In a further refinement, the safety device comprises a transmitter and a receiver forming a non-contact protective device which moves with the tool, with the at least one acceleration sensor being arranged in the transmitter and/or the receiver.

The protective device is not restricted to a conventional light barrier arrangement, but can also contain a camera as a receiver. The arrangement of the at least one acceleration sensor in the area of the receiver allows to check the vertical adjustment of the transmitter/receiver very easily, and even during monitoring operation, on the basis of the gravitational bias and the accelerations. In addition, the installation effort for the novel safety device is further reduced, since the transmitter and receiver have to be fitted to the installation in any case.

It goes without saying that the features mentioned above and those which are still to be explained in the following text can be used not only in the respectively stated combination but also in other combinations or on their own, without departing from the scope of the present invention.

BRIEF DESCRIPTION OF THE DRAWINGS

Embodiments of the invention will be explained in more detail in the following description, and are illustrated in the drawing, in which.

DESCRIPTION OF PREFERRED EMBODIMENTS

Figure 1:
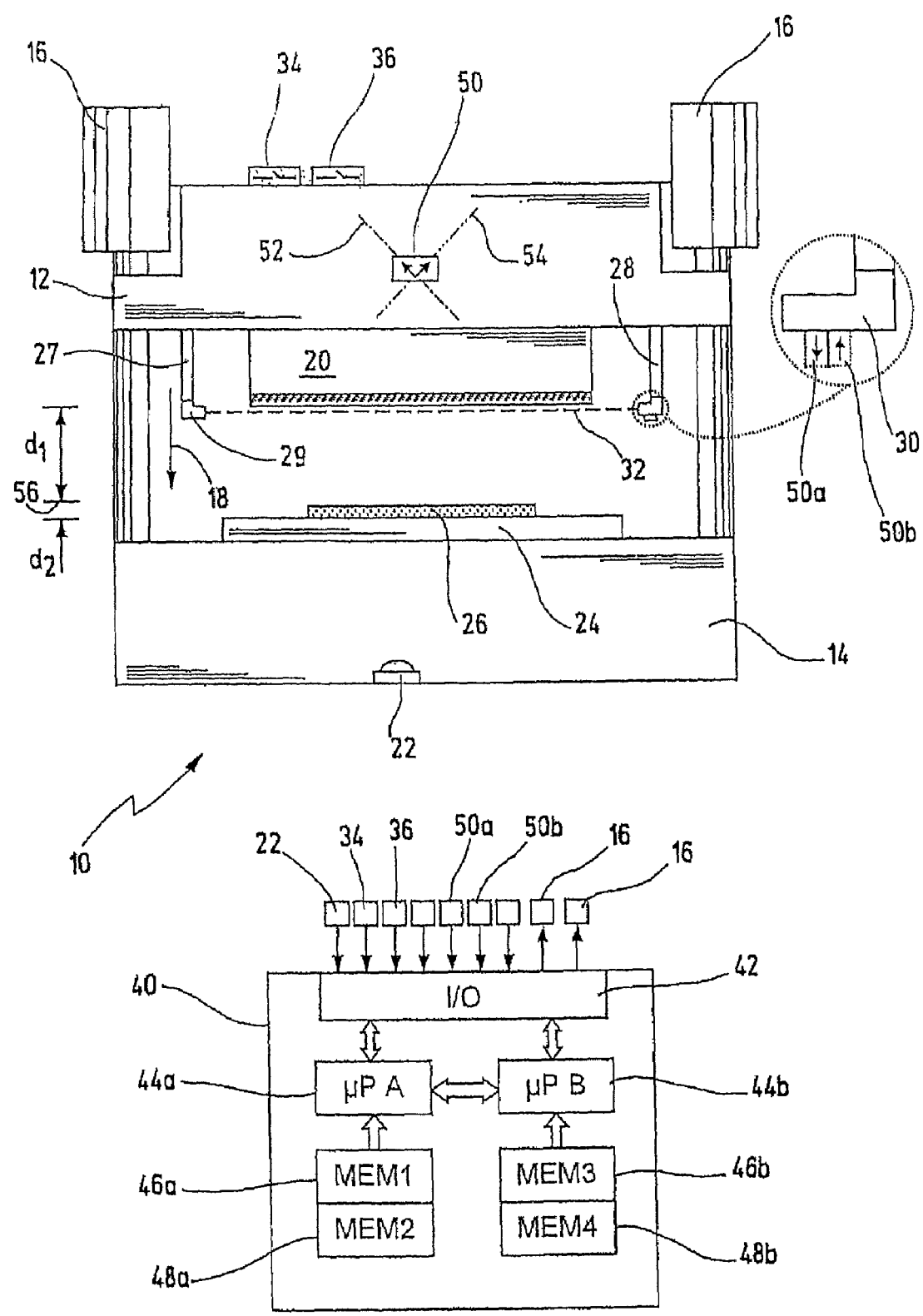
FIG. 1 shows a simplified illustration of a preferred embodiment of the invention.

In FIG. 1, a press which is a preferred embodiment of the novel installation, is designated by reference number 10.

The press 10 has an upper tool 12 (moving installation part) and a lower tool 14. The reference numbers 16 represent two drives, in a simplified form, by means of which the upper tool 12 can be moved towards the lower tool 14 in the direction of an arrow 18. A bending tool 20 is arranged on the upper tool 12. The reference number 22 represents a foot-operated button, in a simplified form, which must be operated in order to start and to carry out a working cycle of the press 10. As an alternative to this, the press 10 can also be operated via other control elements.

A die 24 is arranged on the lower tool 14, and a workpiece 26, such as a sheet-metal part, rests on it. The lower end of the bending tool 20 is designed to be complementary to the die 24 and allows the workpiece 26 to be shaped as it is driven into the die 24.

The reference numbers 27 and 28 denote two holders, which are arranged on the upper tool 12 and on the left and right of the bending tool 20. A transmitter 29 is located at the end of the holder 27, and a receiver 30 is located at the end of the holder 28. The transmitter 29 and receiver 30 form a light barrier arrangement, which produces one or more light beams 32 which run parallel to the lower edge of the bending tool 20, a short distance away from it. The light beam or beams 32 move downwards together with the bending tool 20 in the direction of the arrow 18; in other words, the transmitter 29 and receiver 30 form a non-contact protective device which moves together with the upper tool, as is generally known from the documents cited initially. As an alternative to this, the non-contact protective device can also be provided by a camera unit or by other optical means.

The reference numbers 34 and 36 schematically represent two limit switches, which are closed only when the upper tool 12 is at its upper dead point. The closed position of the limit switches 34, 36 thus signals that the press 10 is in its initial state for carrying out a working cycle.

Reference number 40 represents a control unit, in a simplified form, which controls at least some of the functions of the press 10. In a preferred embodiment, the control unit is a fail-safe PLC as is marketed by the present applicant under the brand name PSS®. The control unit 40 contains (illustrated in simplified form) an interface part 42 and two or more redundant signal processing channels. In this case, the signal processing channels are illustrated only with a respective processor 44a, 44b, a first memory 46a, 46b and a second memory 48a, 48b. The processors 44a, 44b can communicate with one another via an appropriate interface (such as a bus link or a dual-ported RAM), and they carry out a plausibility check on the respective processing results. The interface part 42 has a plurality of inputs and outputs, to which the sensors and actuators for the press 10 are connected. In particular, the foot-operated button 22, the limit switches 34, 36 and at least the receiver 30 of the light barrier arrangement are connected. Furthermore, the drives 60 for the press can be switched off (via suitable actuators, such as contactors, not illustrated here).

Reference number 50 schematically represents an acceleration sensor which in this case, by way of example, is arranged on the upper tool 12 of the press 10. In this embodiment, the acceleration sensor 50 has two sensor axes 52, 54, i.e. it provides acceleration values along the two axes 52, 54, which run at right angles to one another. In the illustrated embodiment, the acceleration sensor 50 is arranged such that each sensor axis 52, 54 runs at an angle of 45° to the movement direction 18 of the upper tool 12. Redundant information about the acceleration of the upper tool 12 along the movement direction 18 can be derived by vectorial evaluation of the acceleration measured values along the two sensor axes 52, 54.

As an alternative to or in addition to the acceleration sensor 50, the press 10 in another embodiment has two individual acceleration sensors 50a, 50b, which are arranged adjacent to the receiver 30 (or adjacent to the transmitter 29), or at least in their area. The acceleration sensors 50a, 50b are integrated in the receiver 30 in one embodiment. In the preferred embodiment, the acceleration sensors 50a, 50b are arranged in two different mounting positions, namely rotated through 180° with respect to one another. In consequence, the acceleration sensors 50a, 50b provide different gravitational biases and the voltage signals at the output of the sensors are in opposite senses, thus allowing advantageous subtraction.

It is self-evident that the acceleration sensor 50 can likewise be integrated in the transmitter 29 or the receiver 30, as an alternative to the simplified illustration. Furthermore, the two individual acceleration sensors 50a, 50b could, in contrast to the illustrated arrangement, be arranged in or adjacent to the receiver, or else at some other point on the upper tool 12, or at some other point at which the accelerations of the upper tool, or of the bending tool 20, can be measured. If required, further acceleration sensors can also be used in order to increase the redundancy, and/or to determine further movement variables.

The output signals from the acceleration sensor or sensors 50, 50a, 50b are likewise fed to the control unit 40, as is indicated by the reference numbers 52, 54 for the control unit 40.

In the present embodiment, a movement velocity of the upper tool 12 and the slowing-down travel ("braking travel"), the switching point between high speed and creeping speed, as well as the muting point for the light barrier arrangement are determined in the control unit 40. An appropriate program module for this purpose is stored in the memories 46a, 46b. In other words, the program modules in the memories 46a, 46b each form an evaluation unit in terms of the present invention. However, as an alternative to this, the evaluation unit could also be provided separately from the control unit 40. In an embodiment, the evaluation unit is, for the purposes of the present invention, completely integrated in the receiver 30 of the light barrier arrangement. All of the other safety-relevant tasks might also reside there, so that the control unit 40 may be a conventional, non-safe control unit.

In order to start a working cycle of the press 10, the upper tool 12 must be located at its upper dead point (as illustrated in FIG. 1). This initial position can be detected in a fail-safe form by the limit switches 34, 36.

On operation of the foot-operated button 22, the upper tool 12 is moved, together with the bending tool 20, downwards at a high movement velocity (high speed). The high movement velocity is maintained until the bending tool 20 reaches a predefined switching point 56. The distance traveled at high speed is designated $d_1$ in FIG. 1. After the switching point, the upper tool 12 together with the bending tool 20 moves only at creeping speed in order to complete the shaping process. The distance traveled is indicated by $d_2$ in FIG. 1.

Figure 3:
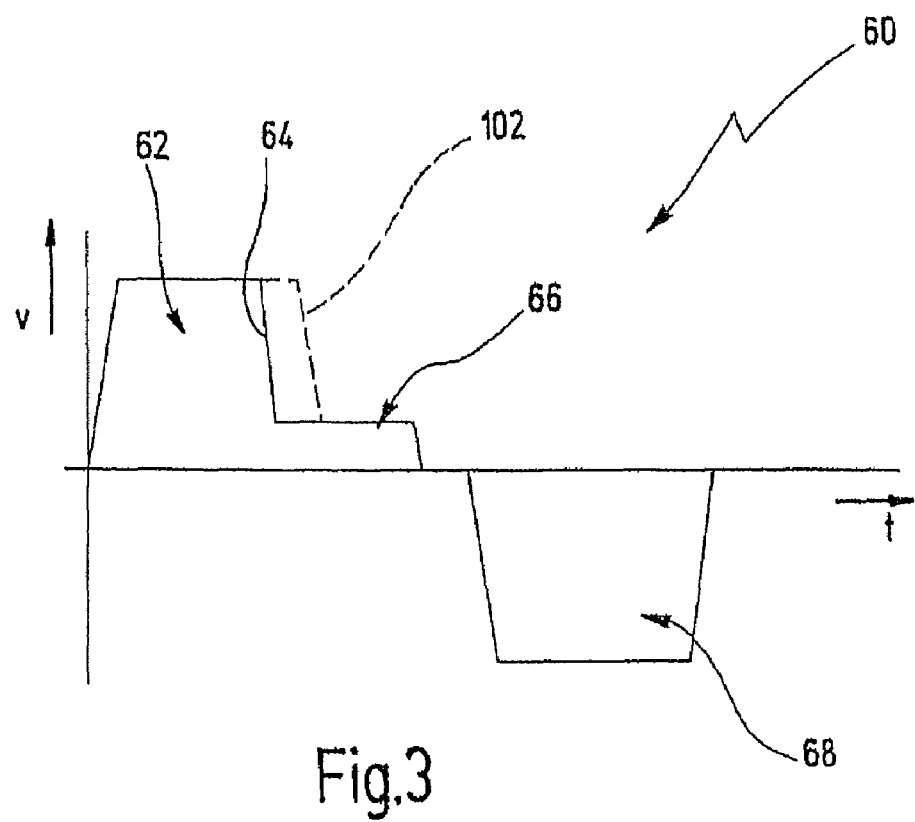
FIG. 3 shows a schematic illustration of a velocity profile of the moving installation part of the installation shown in FIG. 1.

The upper tool 12 then returns to its initial position (upper dead point) again. This generally once again takes place at high speed, but in the opposite movement direction. FIG. 3 shows a simplified form of a corresponding velocity profile, with the profile of the velocity being plotted against time. During a first phase 62, the upper tool 12 assumes its maximum velocity (high speed), and is then braked again on reaching the switching point 56 (flank 64). The movement is then continued at a lower speed (creeping speed, phase 66). In some presses, the movement at the creeping speed in phase 66 must be specifically initiated by renewed operation of a control switch. Once the workpiece has been shaped, the upper tool returns at high speed, but in the opposite movement direction (phase 68).

Figure 2:
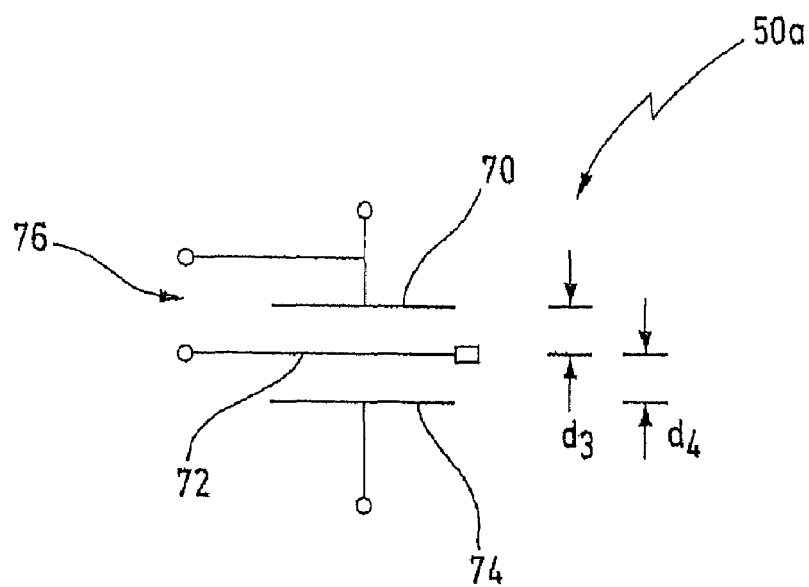
FIG. 2 shows a simplified illustration of a capacitive acceleration sensor, which can advantageously be used in embodiments of the invention.

FIG. 2 schematically shows the design of a capacitive acceleration sensor 50a, as may be used in the embodiment shown in FIG. 1. The acceleration sensor 50a has a measurement element which can be considered, in a simplified form, to be a "duplicated-plate capacitor" with three mutually parallel plates 70, 72, 74. The central plate 72 is mounted such that it can move. In the rest state, the distance between the plates 70, 72 is approximately the same as the distance between the plates 72, 74. When the acceleration sensor 50a is accelerated, the distances $d_3$ and $d_4$ change as a result of the inertia of the central plate 72. The changed distances result in a change of the capacitance values $C_1$ and $C_2$ of the two capacitors, which can be detected by measurement.

In the present case, the acceleration sensor 50a has a test input 76 to which a test signal can be applied. The test signal can be used to deliberately deflect the central plate 72, which must show up at the output of the acceleration sensor as a corresponding "acceleration signal". This allows the acceleration sensor to be checked for correct operation.

However, it should be noted that the present invention is not restricted to capacitive acceleration sensors. For example, piezo-resistive acceleration sensors can also be used, in which case the displacement of a mass element is determined using piezo-elements. Other measurement principles can also be used for (preferably direct) detection of accelerations by measurement.

The velocity of the upper tool can be determined from the detected accelerations by integrating the acceleration values over time. Mathematically, the relationship is:

$$v_{A/B}(t) = v_0 + \int_{t_1}^{t_2} a_{A/B} dt,$$

where $v_{A/B}(t)$ is the velocity profile over time, which is determined in the two evaluation channels A and B, respectively, $v_0$ is the velocity at the start of the integration process, $a_{A/B}$ are the acceleration values detected by measurement in the respective channels A and B, and $t_1, t_2$ are the start and end times, respectively, of the time interval over which the acceleration values $a_{A/B}$ are integrated.

The distance traveled can be determined in the same way from the resultant velocity using the following relationship:

$$s_{A/B}(t) = s_0 + \int_{t_1}^{t_2} v_{A/B} dt,$$

where $s_{A/B}(t)$ is the distance traveled at the time t, $s_0$ is the location at the start of the integration process, $v_{A/B}$ is the velocity at which the distance s was traveled, to be precise separately for the channels A and B, and $t_1, t_2$ are the start and end times of the time interval under consideration.

Since the upper tool 12 is located at its upper dead point at the start of each working cycle, the velocity at the start of each working cycle is zero. The distance traveled with respect to the upper dead point at the start of each working cycle is likewise zero. Continuous or quasi-continuous detection of the acceleration values therefore allows continuous determination of the velocity and of the distance traveled. The respective instantaneous position of the upper tool 12 can also be determined from the distance traveled. It is also possible to determine whether the upper tool has reached the switching point for switching between high speed and creeping speed. Furthermore, a slowing-down measurement is possible if the initiation of the emergency stop is used as the start time $t_1$, and the time at which the upper tool 12 becomes completely stationary is used as the end time $t_2$.

Figure 4:
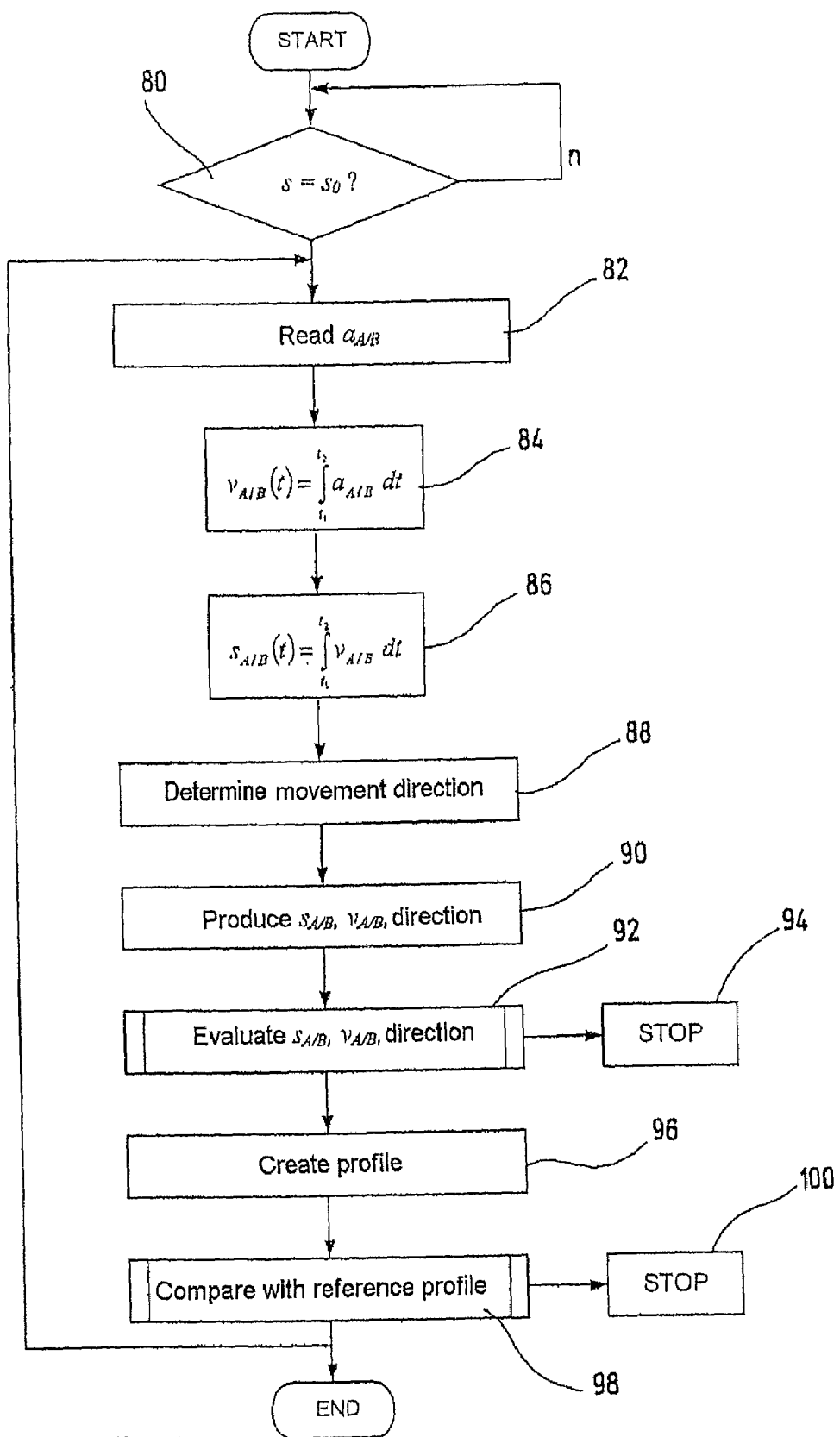
FIG. 4 shows a simplified flowchart in order to explain an embodiment of the method according to the invention.

A preferred embodiment of the method according to the invention is illustrated in simplified form in FIG. 4. First, a check is carried out in step 80 to determine whether the upper tool 12 is at its upper dead point (designated $s_0$). The process does not move to step 82, in which the acceleration values $a_A$ and $a_B$ are read in a redundant form, until this condition is satisfied. The movement velocity and the distance traveled are then determined by integration in steps 84 and 86. Furthermore, the movement direction is determined in step 88, in which case this step is optional and may be omitted if required. The information obtained is then produced in step 90, in order to allow evaluation in step 92.

The velocity values and/or position values and direction values obtained are evaluated in a manner known per se. In particular, a check is carried out to determine whether the respective velocity of the upper tool is less than the maximum velocities defined for safe operation. Furthermore, another check is carried out to determine whether the upper tool is in a position (has traveled a movement distance) which corresponds to a correct working cycle. If this is not the case, an emergency stop is carried out in step 94, since the press 10 is in an unsafe state then. In this situation, it might be envisaged not to initiate the emergency stop immediately on the basis of the velocity and/or position values obtained, but, for example, just to suppress the deactivation (muting) of the light barrier arrangement, so that the emergency stop is initiated when the light beam 32 is interrupted by the workpiece 26.

In the preferred embodiment, the determined velocity and/or position values are used to create a movement profile, as is illustrated in a simplified form in FIG. 3. The recorded movement profile is compared with a reference profile in step 98. For example, it is possible to determine when the upper tool has been moving at its high speed for longer than intended, as is indicated in a simplified form by the reference number 102 in FIG. 4. In a situation such as this, the press is again switched off in step 100 in order to avoid a situation which would be dangerous for the operator.

What is claimed is:

1. An automatically operating installation comprising at least one installation part which is moved in an automated manner, comprising a control unit designed to control the movements of the installation part, and comprising a safety device which is designed to determine at least one movement variable of the installation part in a safety-related manner, said safety device comprising at least one acceleration sensor and an evaluation unit, wherein the acceleration sensor is adapted to be coupled to the moving installation part for detecting any acceleration of the moving installation part, wherein the evaluation unit is designed to determine at least one of a movement velocity and a movement travel of the installation part on the basis of the acceleration detected by the acceleration sensor, and wherein the control unit is operable to cause an emergency stop of the installation part depending at least in part on an output signal from the acceleration sensor.

2. The installation of claim 1, wherein the moving installation part is a tool moving like a stamp.

3. The installation of claim 1, further comprising a light barrier associated with the installation part, the control unit being operable to cause an emergency stop of the installation part depending at least in part on an output signal from the light barrier.

4. The installation of claim 1, further comprising a camera associated with the installation part, the control unit being operable to cause an emergency stop of the installation part depending at least in part on an output signal from the camera.

5. The installation of claim 1, wherein the installation is a sheet-metal press machine, the at least one acceleration sensor includes two offset acceleration sensors, and at least one of the control unit and the evaluation unit includes at least two redundant signal processing channels.

6. The installation of claim 1, wherein at least one of the control unit and the evaluation unit uses an output signal from the acceleration sensor to determine a starting point of movement of the installation part.

7. A safety device for fail-safely determining at least one movement variable of a moving part of an automatically operating installation, the safety device comprising at least one acceleration sensor and an evaluation unit, wherein the acceleration sensor is adapted to be coupled to the moving installation part for fail-safely detecting an acceleration of the moving installation part, and wherein the evaluation unit is designed to fail-safely determine at least one of a movement velocity and a movement travel of the installation part on the basis of the acceleration, the evaluation unit operably determining if a situation is dangerous for an operator of the installation based at least in part on an output signal from the acceleration sensor.

8. The safety device of claim 7, comprising at least two acceleration sensors, with the evaluation unit being designed to redundantly determine the at least one of the movement velocity and the movement travel on the basis of the at least two acceleration sensors.

9. The safety device of claim 8, wherein each acceleration sensor defines a sensor axis along which an acceleration is detected, and wherein the at least two acceleration sensors are arranged such that the respective sensor axes are different.

10. The safety device of claim 8, further comprising sensor housing, where the at least two acceleration sensors are commonly integrated.

11. The safety device of claim 8, wherein the at least two acceleration sensors are coupled to the moving installation part with at least two different mounting positions, such that the at least two acceleration sensors receive different gravitational biases.

12. The safety device of claim 11, wherein the mounting positions of the at least two acceleration sensors are arranged offset through 180° with respect to one another.

13. The safety device of claim 8, wherein the evaluation unit is designed to read the at least two acceleration sensors with a time offset between them.

14. The safety device of claim 7, wherein the at least one acceleration sensor has a test input for feeding in a test signal.

15. The safety device of claim 7, wherein the evaluation unit is further designed to fail-safely determine a movement direction of the moving installation part on the basis of the acceleration.

16. The safety device of claim 7, further comprising a detector designed to detect when the moving installation part has reached a defined rest position, with the detector being coupled to the evaluation unit.

17. The safety device of claim 7, wherein the moving installation part defines an actual movement profile which represents the behaviour of the movement variable versus time, with the safety device further comprising a memory coupled to the evaluation unit and designed to store a reference movement profile, wherein the evaluation unit is designed to stop the moving installation part as a function of the actual movement profile and the reference movement profile.

18. The safety device of claim 7, further comprising a transmitter and a receiver forming a non-contact protective device, which is adapted to move concurrently with the moving part, with the at least one acceleration sensor being arranged in at least one of the transmitter and the receiver.

19. The installation of claim 7, further comprising a light barrier associated with the installation part, the evaluation unit being operable to cause an emergency stop of the installation part depending at least in part on an output signal from the light barrier.

20. The installation of claim 7, further comprising a camera associated with the installation part, the evaluation unit being operable to cause an emergency stop of the installation part depending at least in part on an output signal from the camera.

21. The installation of claim 7, wherein the installation is a sheet-metal press machine, the at least one acceleration sensor includes two offset acceleration sensors, and at least one of a control unit and the evaluation unit includes at least two redundant signal processing channels.

22. The installation of claim 7, wherein at least one of a control unit and the evaluation unit uses an output signal from the acceleration sensor to determine a starting point of movement of the installation part.

23. A method for safety-related stopping of a moving part of an automatically operating machine, the method comprising:
- fail-safely determining a movement variable of the moving part,
- fail-safely comparing the determined movement variable with a predefined reference value,
- fail-safely stopping the moving part as a function of the determined movement variable and the defined reference value,
- wherein, in order to determine the movement variable, an acceleration of the moving part is first detected by an acceleration sensor,
- wherein at least one of a movement velocity and a movement travel of the moving part is determined as the movement variable on the basis of the detected acceleration, and
- automatically preventing the part of the machine from moving if at least the acceleration sensor senses an unsafe condition.

24. The method of claim 23, wherein the moving part is a tool moving like a stamp, and wherein at least one of the following variables is determined as the movement variable: movement velocity of the tool, slowing-down travel of the tool, position of the tool, movement direction of the tool.

25. The method of claim 23, further comprising automatically preventing the part of the machine from moving if at least a light barrier indicates than an unsafe condition exists.

26. The method of claim 23, further comprising automatically stopping the moving part of the machine if the acceleration sensor sends an output signal indicating that an unsafe operator condition exists.

27. A method for safety-related stopping of a moving part of a press machine, the method comprising:
- (a) sensing acceleration of the moving part of the press machine with a sensor mounted thereto;
- (b) receiving an output signal from the sensor;
- (c) receiving an output signal from an optical receiver, the optical receiving including at least one of a light barrier receiver and a camera receiver; and
- (d) automatically determining if an unsafe press machine condition exists to an operator of the press machine based on the output signals from the sensor and the optical receiver.

28. The method of claim 27, further comprising preventing the moving part from moving if the unsafe condition is determined by an electronic controller.

\* \* \* \* \*